United States Patent
McGibney et al.

(10) Patent No.: US 9,354,841 B2
(45) Date of Patent: May 31, 2016

(54) WIRELESSLY COMMUNICATING CONFIGURATION DATA FOR INTERACTIVE DISPLAY DEVICES

(71) Applicant: Smart Technologies ULC, Calgary (CA)

(72) Inventors: Grant McGibney, Calgary (CA); Angela Thomas, Calgary (CA); Leonardo Miguel Araneta, Ontario (CA); Phillip Warren Benson, Calgary (CA)

(73) Assignee: Smart Technologies ULC (CA)

( * ) Notice: Subject to any disclaimer, the term of this patent is extended or adjusted under 35 U.S.C. 154(b) by 0 days.

(21) Appl. No.: 14/459,023

(22) Filed: Aug. 13, 2014

(65) Prior Publication Data

US 2016/0048368 A1   Feb. 18, 2016

(51) Int. Cl.
*G06F 3/14* (2006.01)
*H04L 12/24* (2006.01)
*G09G 5/12* (2006.01)

(52) U.S. Cl.
CPC .......... *G06F 3/1454* (2013.01); *G09G 5/12* (2013.01); *H04L 41/08* (2013.01); *G09G 2354/00* (2013.01); *G09G 2370/16* (2013.01)

(58) Field of Classification Search
None
See application file for complete search history.

(56) References Cited

U.S. PATENT DOCUMENTS

| 2014/0195927 A1* | 7/2014 | DeWeese | H04L 63/10 715/750 |
| 2014/0306865 A1* | 10/2014 | Pan | G06F 3/1423 345/2.1 |

OTHER PUBLICATIONS

"Gizmodo Use an iPhone as Color Palette and an iPad as the Canvas With the Remote Palette App",—http://gizmodo.com/5663637/use-an-iphone-as-a-color-palette-and-an-ipad-as-the-canvas-with-the-remote-palette-app, Oct. 14, 2010, 6 pages.
"MagicQ Remote Application", www.chamsys.co.uk, Jan. 8, 2010, 4 pages.
"Remote Palette on the App Store on iTunes",—https://itunes.apple.com/us/app/remote-palette/id386596739?mt=8, Aug. 20, 2010, 2 pages.
McCarty, "Remote Palette: iPhone as palette, iPad as canvas", http://thenextweb.com/apps/2010/10/13/remote-palette-iphone-as-palette-ipad-as-canvas/, Oct. 13, 2010, 3 pages.

(Continued)

*Primary Examiner* — Joseph Haley
*Assistant Examiner* — Emily Frank
(74) *Attorney, Agent, or Firm* — Kilpatrick Townsend & Stockton LLP

(57) ABSTRACT

Systems, devices, and methods are provided for wirelessly communicating configuration data from mobile devices for use by interactive display devices. In some aspects, a processing device can identify two or more mobile devices participating in a session for utilizing an interactive display device. The processing device can receive configuration data from each of the mobile devices via a wireless transceiver. The processing device can configure an interactive display device to present outputs during the session using attributes that the processing device identifies from the received configuration data. In additional or alternative aspects, a processing device can identify at least one mobile device participating in a session for utilizing an interactive display device. The processing device can associate outputs presented by the interactive display device with an entity that is identifiable from configuration data that is received from the mobile device.

17 Claims, 6 Drawing Sheets

(56) References Cited

OTHER PUBLICATIONS

Popova, "Remote Palette: Warhol 2.0", http://www.brainpickings.org/index.php/2010/10/14/remote-palette/, Oct. 14, 2010, 11 pages.

Sorrel, "Remote Palette Uses iPhone to Pick Colors for iPad Paintings", http://www.wired.com/2010/10/remote-palette-uses-iphone-to-pick-colors-for-ipad-paintings/, Oct. 14, 2010, 2 pages.

Yana Klimava, "Industrial Design, Graphic Design and Art in Calgary," 00/00/2010, 2 pages.

* cited by examiner

US 9,354,841 B2

WIRELESSLY COMMUNICATING CONFIGURATION DATA FOR INTERACTIVE DISPLAY DEVICES

TECHNICAL FIELD

This disclosure relates generally to computer-implemented methods and systems for remote device management and more particularly relates to wirelessly communicating configuration data from mobile devices for use by interactive display devices.

BACKGROUND

Interactive whiteboards can provide touch detection for computer applications and can display electronic content to large groups of users. Interactive whiteboards may be used in collaborative settings (e.g., in a classroom) in which multiple users add, modify, or otherwise manipulate electronic content via the whiteboard. However, the amount of space available on the whiteboard may be limited by pop-ups, dialogs, and other interfaces that may be displayed on the whiteboard for configuring the whiteboard (e.g., a configuration interface used to select attributes of a drawing tool) or for other purposes. These pop-ups, dialogs, and other interfaces may block, obscure, or otherwise interfere with the presentation of electronic content from different users of the whiteboard in a collaborative setting.

It is desirable for an interface to configure one or more settings of a whiteboard or other interactive display device in a manner that efficiently utilizes the available display area provided by the whiteboard or other interactive display device.

SUMMARY

Systems, devices, and methods are described for wirelessly communicating configuration data from mobile devices for use by interactive display devices.

For example, a processing device that is included in or communicatively coupled to an interactive display device can identify one or more mobile devices that are participating in a session for utilizing the interactive display device. In some aspects, the processing device can receive configuration data from each of multiple mobile devices via a wireless transceiver. The processing device can configure an interactive display device to present outputs during the session using attributes that are identified from the received configuration data. In additional or alternative aspects, the processing device can receive configuration data from a mobile device and associate outputs presented at the interactive display device with an entity that is identifiable from the received configuration data.

These illustrative examples are mentioned not to limit or define the disclosure, but to provide examples to aid understanding thereof. Additional aspects and examples are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
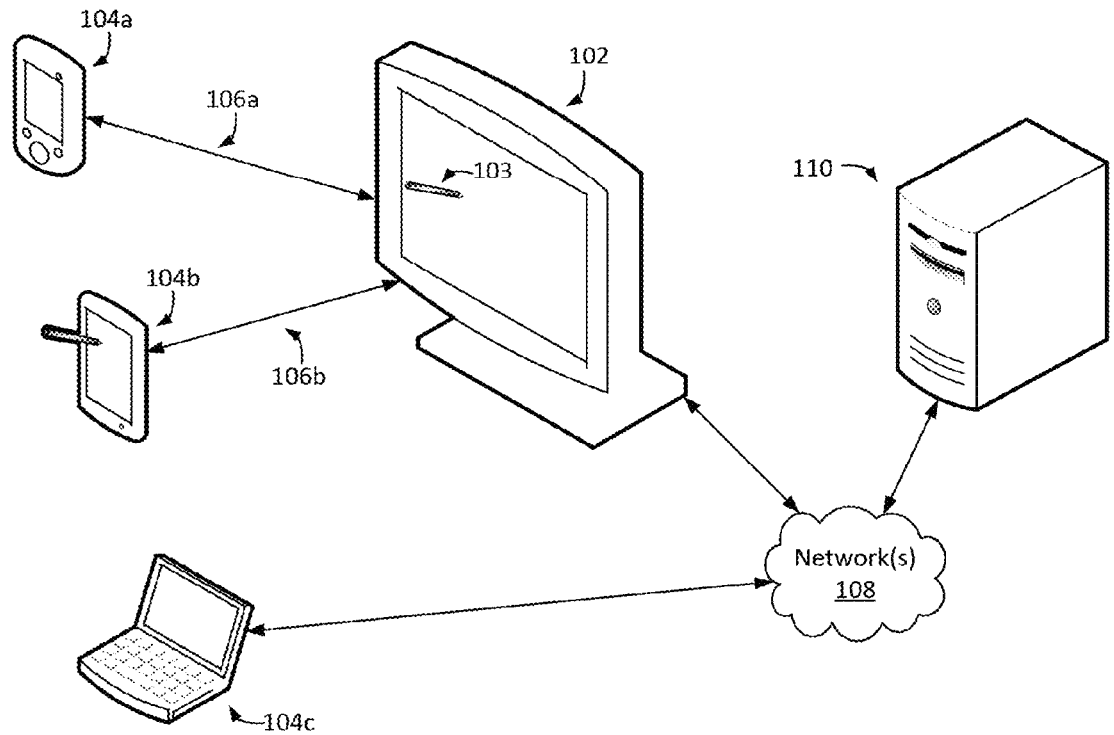
FIG. 1 is a block diagram depicting an example of a computing environment in which an interactive display device can receive configuration data from multiple mobile devices according to certain aspects of the present invention.

Systems, devices, and methods are described for wirelessly communicating configuration data from mobile devices for use by interactive display devices.

The following example is provided to help introduce (without limitation) the general subject matter of certain aspects. Users of an interactive whiteboard or other interactive display device may wish to use their mobile devices to configure one or more features of the whiteboard. The interactive whiteboard may include a processing device and a wireless transceiver. The processing device can use the wireless transceiver to communicate with nearby mobile devices, such as smart phones, during a given session. The session can include a period of time during which a series of inputs to the whiteboard (e.g., multiple sequential touch inputs) cause the whiteboard to present a corresponding set of outputs (e.g., a drawing). Different users can specify visual attributes or other attributes for different outputs and can be uniquely associated with these outputs by using their smart phones to transmit configuration data to the whiteboard during the session. For example, prior to receiving a touch input from a stylus or other interaction object, the processing device of the interactive whiteboard can receive configuration data from a given smart phone. The configuration data can specify an entity (e.g., a user of the smart phone) and a visual attribute (e.g., a color of a drawing generated by a touch input). In response to the interactive whiteboard receiving the touch input, the processing device can configure the whiteboard to display an output having the specified visual attribute and associate the output with the specified user.

In accordance with some aspects, a processing device (e.g., an interactive whiteboard) can identify two or more mobile devices participating in a session for utilizing an interactive display device. In some aspects, the processing device can be included in the interactive display device. In additional or alternative aspects, the processing device can be included in an interaction object (e.g., an electronic stylus or pen) and can be communicatively coupled to the interactive display device. The processing device can receive configuration data from each of the mobile devices via a wireless transceiver. In some aspects, the configuration data can include colors or dimensions used by a drawing function executed by the interactive display device. In additional or alternative aspects, the configuration data can include text or text attributes to be displayed on the interactive display device. The processing device can configure an interactive display device to present outputs during the session using attributes that the processing device identifies from the received configuration data (e.g., visual characteristics, pointer characteristics, identification information for a mobile device and/or a user of a mobile device, etc.). In some aspects, the interactive display device can display or otherwise present the outputs in response to receiving one or more inputs (e.g., touchscreen inputs) after receiving configuration data from one of the mobile devices. In additional or alternative aspects, a suitable interaction object can transmit or otherwise emit a signal that is generated based on configuration data received from one of the mobile devices. The signal can be received by the interactive display device. The interactive display device can display or otherwise present the outputs in response to receiving the signal.

In some aspects, configuration data can also include permissions associated with a user of a mobile device. For example, a processing device that is included in or communicatively coupled to an interactive display device can identify one or more permissions for a user via the configuration data. The interactive display device can display electronic content based on determining from the configuration data that a user is permitted to access the electronic content. The processing device can allow different users to access and display electronic content during the same session, even if one or more permissions for a first user permits access to different electronic content than one or more other permissions for a second user. The use of wirelessly communicated configuration data can allow different users with different access rights to collaboratively work with different electronic content on the same interactive display device during the same session.

As used herein, the term "interactive display device" can refer to a device that can receive or otherwise detect touch inputs or other types of inputs from users and generate outputs in response to the received inputs. A non-limiting example of an interactive display device is an interactive whiteboard that can be communicatively coupled to a computing device.

As used herein, the term "mobile device" can refer to any computing device configured to execute program code and to wirelessly communicate with other computing devices. Non-limiting examples of a mobile device include smart phones, tablet computers, laptop computers, etc.

As used herein, the term "session" can refer to a period of time during which at least two mobile devices are authorized to utilize an interactive display device. A session can be delineated by at least a first point in time and a second point in time. The first point in time can be a time at which a mobile device (or a user associated with a mobile device) is authenticated or otherwise authorized for accessing the interactive display device. The second point in time can be a time at which the authentication or other authorization is terminated (e.g., via the user logging out or the authentication or other authorization expiring after a period of inactivity).

As used herein, the term "input" can refer to any data used by an algorithm. The term "input" can also refer to actions by a user that generate one or more input events (e.g., swiping a touchscreen, pressing a key on a keyboard, moving a mouse, clicking a button on a mouse, etc.).

As used herein, the term "output" can refer to any data generated by an algorithm. The term "output" can also refer to any visual characteristic, audible characteristic, tactile characteristic, or other sensory data that may be detectable by human senses and generated by one or more components of a computing device (e.g., images on a display screen, sound emitted by speakers, etc.). A device can present an output by for example, displaying images, emitting sounds, etc.

As used herein, the term "interaction object" can refer to any tool, device, or object that can provide an input to an interactive display device. In some aspects, an interaction object can include a non-electronic object, such as (but not limited to) a stylus or a finger. A non-electronic interaction object may include one or more components for enhancing the ability of an interactive display device to detect a touch input (e.g., a reflective tip that is used to touch an interactive white board). In other aspects, an interaction object can include one or more processing devices and/or one or more transceiver devices. A non-limiting example of a transceiver device of an interaction object is a device that transmits or otherwise emits a signal (e.g., optical, RF, Wi-Fi, Bluetooth, etc.) that can configure an interactive display device to generate one or more outputs.

In some aspects, wirelessly communicating configuration data from mobile devices for use by interactive display devices can improve a computing system that includes the interactive display device and the mobile devices. For example, using a mobile device to select, enter, or otherwise generate configuration data can maximize the usable display area of an interactive display device. Using a mobile device to select, enter, or otherwise generate configuration data can also allow for distinguishing between inputs from different users even if an interaction object is a non-electronic tool or object (e.g., a finger) that provides no way to identify the operator of the interaction object.

In some aspects, using a mobile device to wirelessly transmit configuration data to interactive display devices can reduce the amount of time during which the interactive display device is in operation, which may prolong the operational lifespan of the interactive display device. For example, using mobile devices to allow different users to individually generate configuration data can reduce time spent by a user navigating to a configuration interface on the interactive display device itself.

In some aspects, using a mobile device to wirelessly transmit configuration data to electronic interaction objects (e.g., an active pen) can simplify the design and/or minimize the device profile of electronic interaction objects. For example, wirelessly communicating configuration data from mobile devices to electronic interaction objects can increase the number of different configuration settings that can be modified on the interaction object without requiring additional switches, buttons, or other components on the interaction object for configuring the interaction object.

Referring now to the drawings, FIG. 1 is a block diagram depicting an example of a computing environment in which an interactive display device 102 can receive configuration data from multiple mobile devices 104a, 104b, 104c. A non-limiting example of an interactive display device 102 is an interactive white board or other touch screen device that is sufficiently large to be viewed by multiple individuals at a location in which the mobile devices 104a, 104b, 104c are positioned. The mobile devices 104a, 104b, 104c can be used to select configuration settings to be used by the interactive display device 102 when presenting electronic content.

A user may use an interaction object 103 to enter touchscreen inputs at an interactive display device 102. Non-limiting examples of an interaction object 103 include a stylus (as depicted in FIG. 1), an electronic pen device, a user's finger, etc. In some aspects, the interaction object 103 can be an active device that includes electronics for processing and/or transmitting data. In other aspects, the interaction object 103 can be a passive object without electronics for processing and/or transmitting data. In some aspects, a passive interaction object 103 can include one or more components (e.g., a reflective tip) that can allow the interactive display device 102 to more easily detect touch inputs from the interaction object 103.

The mobile devices 104a, 104b, 104c can be used to customize the presentation of outputs at the interactive display device 102 in response to the interactive display device 102 receiving inputs associated with a specific user. In some aspects, a specific mobile device can generate and transmit configuration data to the interactive display device 102 (either directly or via another device). In additional or alternative aspects, a specific mobile device can generate and transmit configuration data to an interaction object 103 (either directly or via another device) that is configured to receive and process configuration data. A processing device associated with the interactive display device 102 and/or the interaction object 103 can use the received configuration data to control how the interactive display device 102 will respond to touch inputs or other inputs that are detected after this configuration data is received by the processing device. In some aspects, a processing device associated with the interactive display device 102 and/or the interaction object 103 can use the configuration data to determine that a user or other entity is to be associated with one or more inputs after the configuration data is received by the processing device and these inputs are detected using the interactive display device 102 and/or provided by the interaction object 103.

In a non-limiting example, a user may use an interaction object 103 to enter touchscreen inputs at the interactive display device 102. Prior to the user entering the touchscreen inputs, the interactive display device 102 can receive configuration data from the user's mobile device that is entered or selected by the user via an interface displayed the mobile device. The user can select different functions (e.g., drawing pen, object insertion, text entry, etc.) that the interactive display device 102 can perform in response to a touchscreen input performed using the interaction object 103. Configuration data that describes or otherwise indicates the selection can be generated by the mobile device. The mobile device can transmit the configuration data to the interactive display device 102 and/or the interaction object 103 through a network or other suitable communication link. Subsequent to the interactive display device 102 receiving the configuration information, a touchscreen input can be performed at the interactive display device 102 using the interaction object 103. The interactive display device 102 can generate and present outputs in response to the touchscreen inputs from the interaction object 103. The interactive display device 102 can be configured such that the outputs are presented in accordance with the configuration data received from the mobile device. For example, the interactive display device 102 can render drawing inputs using a color selected via a "palette" interface at the mobile device. In additional or alternative aspects, the interactive display device 102 can be configured such that the outputs are tracked in accordance with the configuration data received from the mobile device. The interactive display device 102 can generate or otherwise obtain identification data from the configuration data. The identification data identifies a user (e.g., "Joe Snuffy") or a mobile device (e.g., "IP address 123.456.789.321") that is to be associated with subsequently received inputs. The interactive display device 102 can store the identification data to a non-transitory computer-readable medium or transmit the identification data to another device having a non-transitory computer-readable medium (e.g., a server) for storage.

The interactive display device 102 can communicate with mobile devices 104a, 104b, 104c. Non-limiting examples of the mobile devices 104a, 104b, 104c may include a smart phone, a tablet computer, a laptop computer, or any other mobile computing device. In some aspects, a mobile device can communicate directly with the interactive display device 102 via a short-range wireless communication link. For example, in the computing environment depicted in FIG. 1, the interactive display device is communicatively coupled to the mobile devices 104a, 104b via respective short-range wireless links 106a, 106b (e.g., Bluetooth interface, a wireless RF interface, etc.). In additional or alternative aspects, a mobile device can communicate with the interactive display device 102 via a server or other computing device. The server or other computing device can communicate with the mobile device and the interactive display device 102 via one or more suitable data networks. For example, in the computing environment depicted in FIG. 1, the interactive display device 102, the mobile devices 104c, and a server 110 are communicatively coupled to one another via one or more data networks 108 (e.g., via an Ethernet network).

Communication links can be established among the interactive display devices 102 and one or more of the mobile devices 104a, 104b, 104c in any suitable manner. For example, one of the mobile devices 104a, 104b, 104c can be used to establish a connection to an interactive display device 102 by tapping and holding the computing device against the interactive display device 102 (i.e., using near-field communication), by establishing a Bluetooth connection, or by establishing a Wi-Fi connection. In some aspects, the interactive display device 102 can assign a unique identifier to a mobile device that establishes a communication link with the interactive display device 102.

In additional or alternative aspects, communication links can be established among one or more active interaction objects 103 and one or more of the mobile devices 104a, 104b, 104c in any suitable manner. For example, one or more of the mobile devices 104a, 104b, 104c can be used to establish a connection to an interaction object 103 such that the interaction object 103 can be independently controlled or otherwise configured via communications with a connected mobile device. In some aspects, different active interaction objects can be controlled by different mobile devices. For example, a first active interaction object can be linked to a first mobile device that controls the first active interaction object via a first communication link, and a second active interaction object can be linked to a second mobile device that controls the second active interaction object via a second communication link. In some aspects, a given interaction object can be controlled or otherwise configured by a single mobile device. For example, the interaction object may only be controlled by the mobile device that has most recently established a communication link with the interaction object. In other aspects, a given interaction object may be configured to store identifiers for multiple mobile devices that have established a communication link with the interaction object. The interaction object can be controlled or otherwise configured by any of the mobile devices that the interaction object can identity from the stored identifiers.

A communication link between a mobile device and an active interaction object can be established in any suitable manner. One non-limiting example of a suitable process for establishing such a communication link involves using an imaging device of the mobile device to scan a code (e.g., a QR code) that is printed on or otherwise associated with the interaction object. Another non-limiting example of a suitable process for establishing such a communication link involves tapping and holding the mobile device and the interaction object together to establish a near-field communication link. Another non-limiting example of a suitable process for establishing such a communication link involves selecting an identifier for the interaction object that is presented in a menu or other interface at the mobile device, etc.

Figure 2:
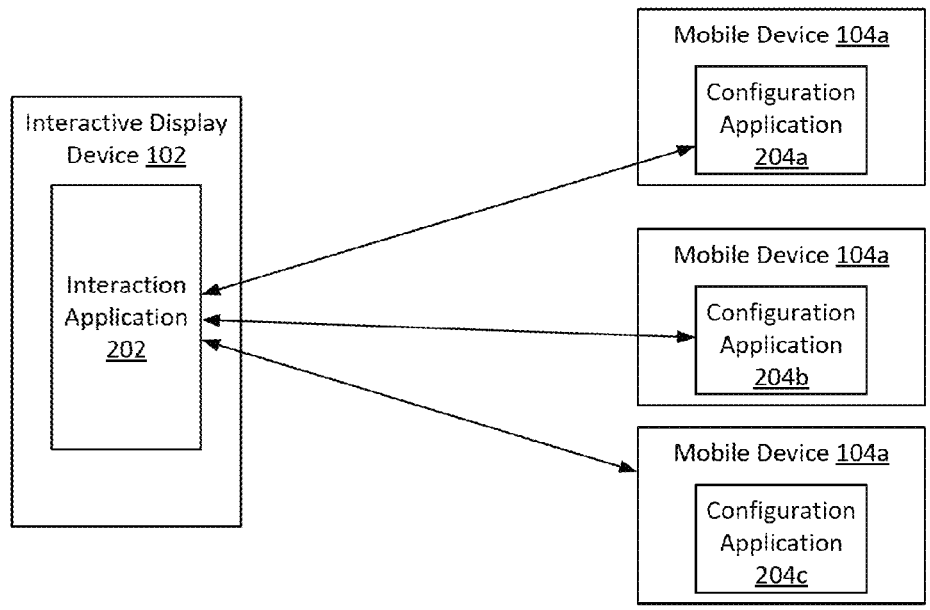
FIG. 2 is a block diagram depicting an example of the interactive display device executing an interaction application that can receive configuration data from configuration applications that are executed by the mobile devices according to certain aspects of the present invention.

FIG. 2 is a block diagram depicting an example of the interactive display device 102 executing an interaction application 202 that can receive configuration data from configuration applications 204a, 204b, 204c that are executed by the mobile devices 104a, 104b, 104c.

The interaction application 202 can include program code executable by one or more processing devices included in or communicatively coupled to the interactive display device 102. The program code can be included in software or firmware installed on a non-transitory computer-readable medium that is included in or communicatively coupled to the interactive display device 102. Executing the interaction application 202 can configure the interactive display device 102 to perform one or more operations for receiving inputs and presenting outputs in response to the inputs, as described in detail herein.

Each of the configuration applications 204a, 204b, 204c can include program code executable by one or more processing devices in a respective one of the mobile devices 104a, 104b, 104c. The program code can be included in software or firmware installed on each of the mobile devices 104a, 104b, 104c. Executing the configuration applications 204a, 204b, 204c can configure the respective mobile devices 104a, 104b, 104c to perform one or more operations for entering, selecting, or otherwise generating configuration data to be provided to the interactive display device 102. In some aspects, executing the configuration applications 204a, 204b, 204c can configure the respective mobile devices 104a, 104b, 104c to perform one or more operations for wirelessly transmitting the configuration data to the interactive display device 102. In additional or alternative aspects, executing the configuration applications 204a, 204b, 204c can configure the respective mobile devices 104a, 104b, 104c to perform one or more operations for wirelessly transmitting the configuration data to an active interaction object 103.

FIGS. 1 and 2 depict a single interactive display device 102 in communication with three mobile devices 104a, 104b, 104c for illustrative purposes only. Other implementations are possible. For example, any number of interactive display devices may communicate with any number of mobile devices.

Similarly, FIG. 2 depicts the interaction application 202 and the configuration applications 204a, 204b, 204c as separate functional blocks for illustrative purposes only, but other implementations are possible. For example, one or more of the interaction application 202 and the configuration applications 204a, 204b, 204c may include program code that is integrated into or otherwise included in the program code of another application executed by a given device.

FIGS. 3-7 are diagrams depicting non-limiting examples of interfaces that can be displayed on mobile devices 104a, 104b, 104c for use with the interactive display device 102. One or more of the interfaces depicted in FIGS. 3-7 can be used to enter, select, or otherwise generate configuration data identifying visual attributes or other attributes of outputs or other features associated with outputs generated by the interactive display device 102 in response to inputs from an interaction object 103.

Figure 3:
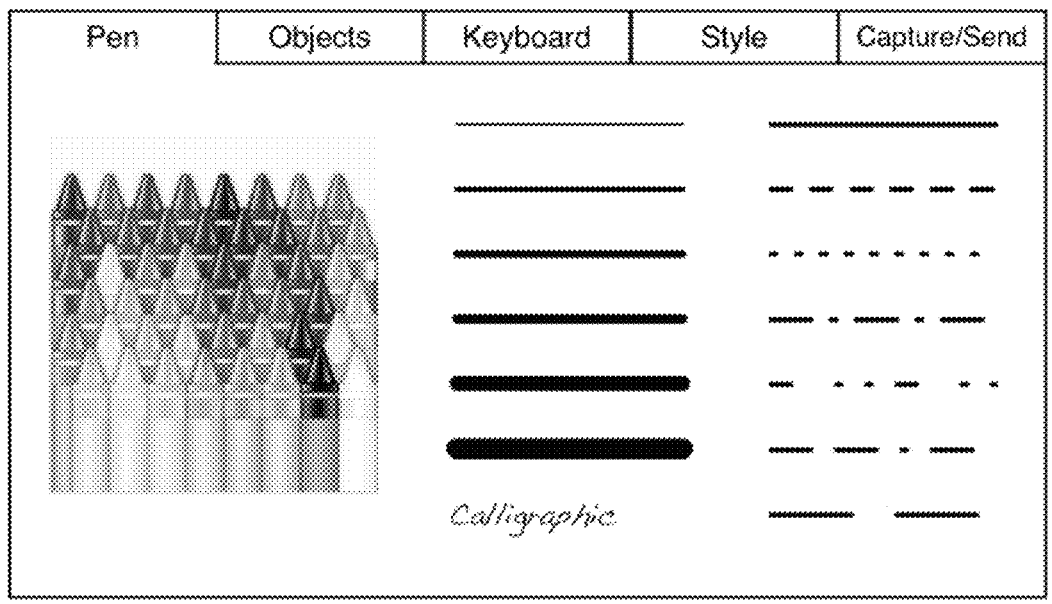
FIG. 3 is a diagram depicting an example of an interface that can be displayed on a mobile device for selecting visual attributes of an electronic drawing tool for drawing shapes on the interactive display device according to certain aspects of the present invention.

The interface 300 depicted in FIG. 3 can be used to select visual attributes of a drawing tool (e.g., a "pen" function) provided by the interaction application 202 for drawing shapes on the interactive display device 102 in response to receiving one or more inputs. For example, a user can select one or more of a color, a width, and a style of a line that will be displayed by the interactive display device 102 in response to one or more touch inputs from the interaction object 103. A configuration application executed at the mobile device can generate configuration data that includes the settings for the drawing tool. The configuration application can configure the mobile device to transmit the configuration data to the interactive display device 102, the interaction object 103, the server 110, or another device. The received configuration data can be used to identify visual attributes to be applied to drawing outputs generated after receiving the configuration data. In one non-limiting example, after the configuration data is received by the interactive display device 102 (either via the server 110 or one of the communication links 106a, 106b), the interaction application 202 executed by a processing device of the interactive display device 102 can respond to receiving a drawing input by rendering a line with a thickness and color that are identified by the configuration data. In another non-limiting example, after the configuration data is received by an active interaction object 103, program code executed by a processing device of the interaction object 103 can configure the interaction object 103 to generate and transmit a signal to the interactive display device 102 that causes the interactive display device 102 to render a line with a thickness and color that are identified by the configuration data.

Figure 4:
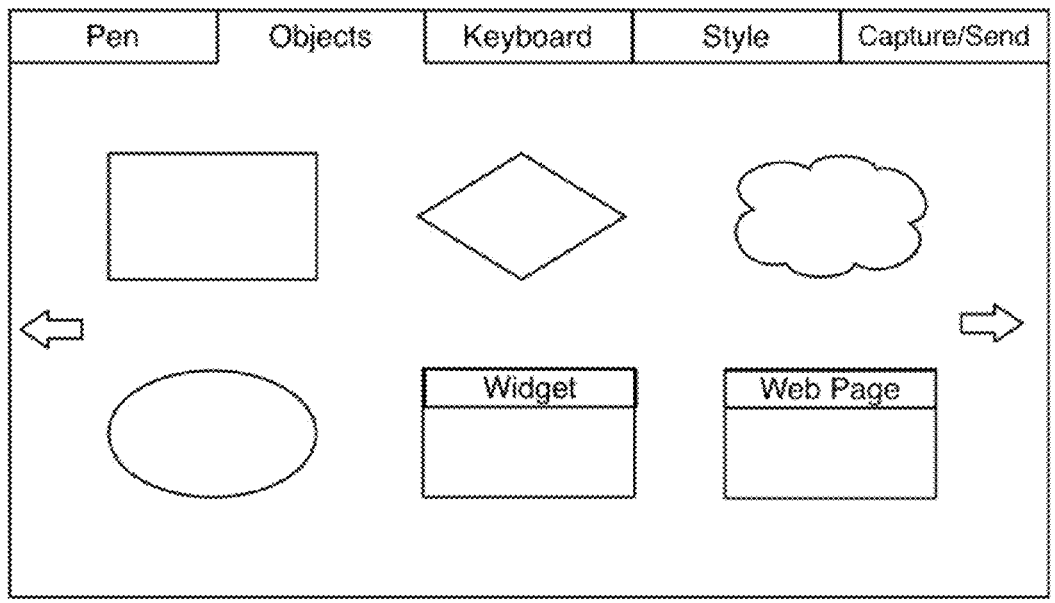
FIG. 4 is a diagram depicting an example of an interface that can be displayed on a mobile device for selecting objects that can be displayed on the interactive display device according to certain aspects of the present invention.

The interface 400 depicted in FIG. 4 can be used to select objects that can be displayed by the interactive display device 102 in response to receiving one or more inputs. The interface 400 can be used to select any type of object. Non-limiting examples of such objects include simple shapes, three-dimensional shapes or objects, complex images, complex objects such as web pages, etc. A user can customize a set of objects presented by the interface 400. A configuration application executed at the mobile device can generate configuration data that includes one or more objects selected using the interface 400. The configuration application can configure the mobile device to transmit the configuration data to the interactive display device 102, the interaction object 103, the server 110, or another device. The received configuration data can be used to identify objects to be presented after receiving the configuration data. For example, after the configuration data is received by the interactive display device 102, the interaction application 202 can respond to an input from the interaction object 103 by rendering an object identified by the configuration data.

Figure 5:
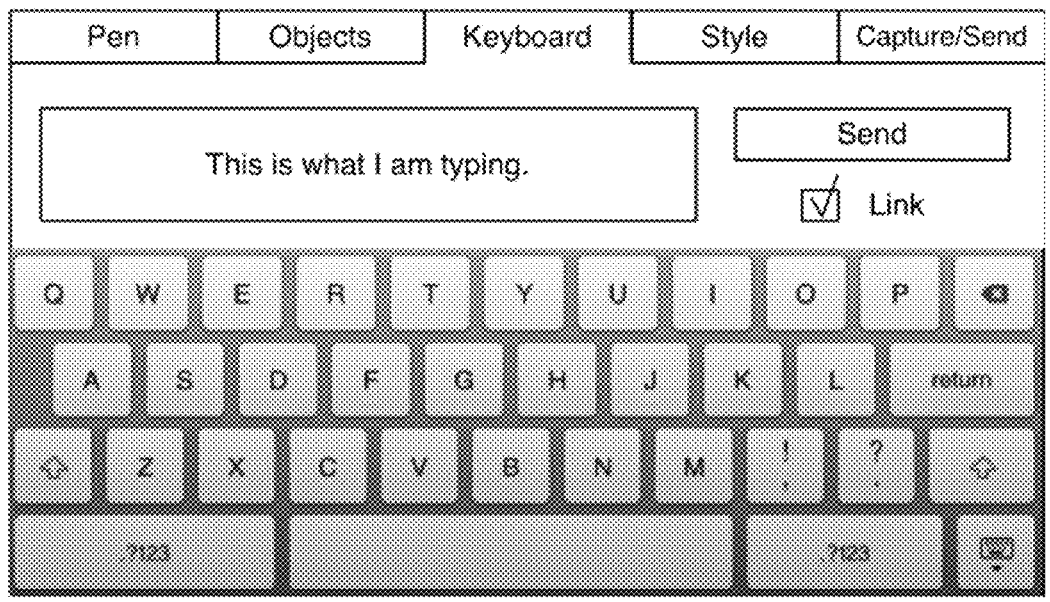
FIG. 5 is a diagram depicting an example of an interface that can be displayed on a mobile device for entering text that can be displayed on the interactive display device according to certain aspects of the present invention.

The interface 500 depicted in FIG. 5 can be used to enter text that can be displayed by the interactive display device 102 in response to receiving one or more inputs. For example, the interface 500 can include a keyboard. A configuration application executed at the mobile device can respond to a selection of the interface 500 by generating configuration data for instructing the interaction application 202 select text displayed by the interactive display device 102. The configuration application can configure the mobile device to transmit the configuration data to the interactive display device 102, the interaction object 103, the server 110, or another device. In a non-limiting example, after the interactive display device 102 receives the configuration data, the interaction application 202 can select text presented at the interactive display device 102 in response to a subsequently received touch input. Selecting text or other electronic content can involve configuring the interactive display device 102 to render a visual indicator at or near the selected text or other electronic content to visually indicate that the text or other electronic content has been selected. In another non-limiting example, after the interactive display device 102 receives the configuration data, the interaction application 202 can display a cursor at the location of a subsequent received touch input. A keyboard included in the interface 500 can be used to send text data to the interactive display device 102 that will replace the selected text or be entered at the cursor location. In some aspects, a user can select a "link" option in the interface 500 such that keystroke data is sent to the interactive display device 102 after each keystroke is received at the mobile device. If the user has not selected the "link" option, the user can type a string and then send the string to the interactive display device 102 by pressing the "send" button in the interface 500.

Figure 6:
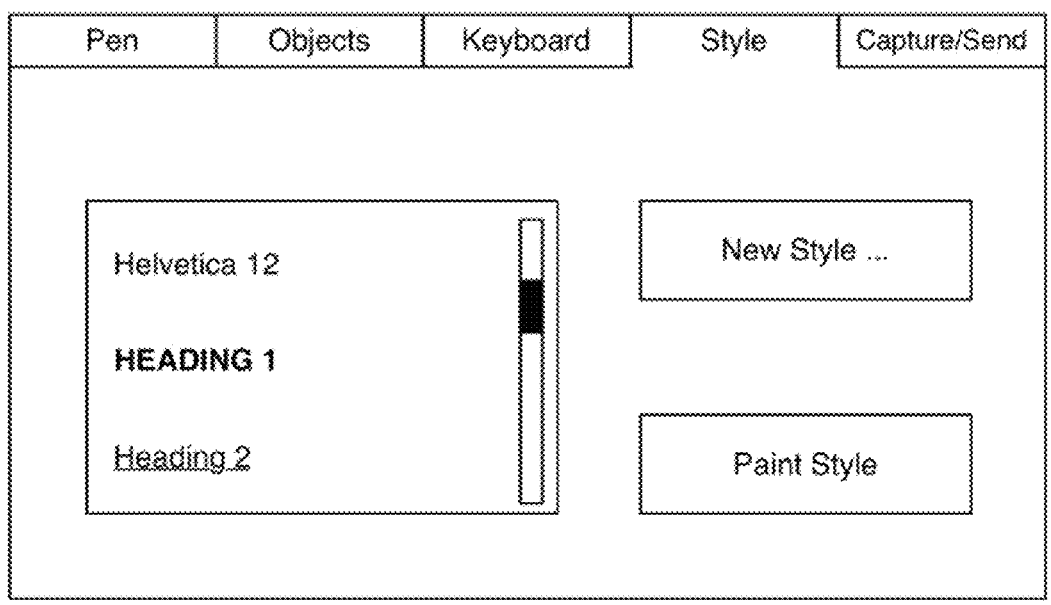
FIG. 6 is a diagram depicting an example of an interface that can be displayed on a mobile device for selecting visual attributes of text that can be displayed on the interactive display device according to certain aspects of the present invention.

The interface 600 depicted in FIG. 6 can be used to select visual attributes of text that is displayed by the interactive display device 102 in response to receiving one or more inputs. A configuration application can generate configuration data that includes one or more style settings, format settings, or other text attributes that are selected, entered, or otherwise identified by a user via the interface 500. The configuration application can configure the mobile device to transmit the configuration data to the interactive display device 102, the interaction object 103, the server 110, or another device. In a non-limiting example, the interaction application 202 can reference the received configuration data to determine how subsequently received text is to be presented. This text can be received via any suitable input (e.g., typed using a keyboard or keyboard interface, handwritten on the interactive display device 102 with a finger or stylus, etc.).

Figure 7:
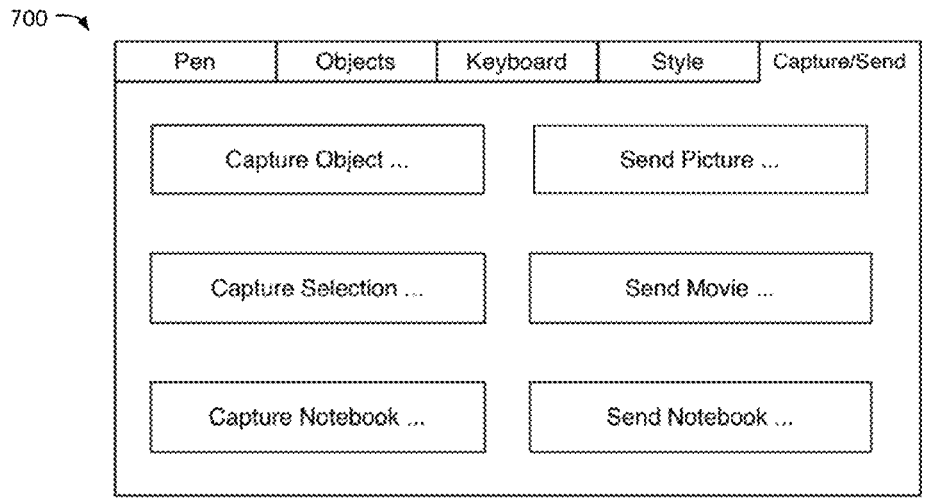
FIG. 7 is a diagram depicting an example of an interface that can be displayed on a mobile device for communicating electronic content to and from the interactive display device for display according to certain aspects of the present invention.

The interface 700 depicted in FIG. 7 can be used to communicate electronic content to and from the interactive display device 102 that is to be displayed in response to the interactive display device 102 receiving one or more inputs. The interface 700 can allow a user to identify electronic content stored on a non-transitory computer-readable medium of the mobile device and to transmit the identified electronic content to the interactive display device 102 for display. For example, the interface 700 can be used to select and transmit image files using the "Send Picture" command, to select and transmit video files using the "Send Movie" command, and/or to select and transmit all content from the user's electronic workspace using the "Send Notebook" command.

Additionally or alternatively, the interface 700 can allow a user to identify electronic content presented by the interactive display device 102 and retrieve the identified electronic content for storage in a non-transitory computer-readable medium of the mobile device. In one non-limiting example, the interface 700 can be used to select and retrieve objects displayed on the interactive display device 102 using the "Capture Object" command. Selecting the "Capture Object" command can configure the mobile device to generate and transmit configuration data to the interactive display device 102 that instructs the interaction application 202 to select and transmit an object identified by a subsequent touch input. In another non-limiting example, the "Capture Object" command of the interface 700 can be used to select and retrieve electronic content displayed on the interactive display device 102 and selected with a touch input. Selecting the "Capture Object" command can configure the mobile device to generate and transmit configuration data to the interactive display device 102 that instructs the interaction application 202 to interpret a subsequently received touch input as a selection input for identifying at least a portion of the electronic content that is displayed on the interactive display device 102. The interaction application 202 can respond to receiving the configuration data by utilizing a subsequently received touch input as a selection input and transmitting the portion of the electronic content identified by the selection input to the mobile device. In another non-limiting example, the "Capture Notebook" command of the interface 700 can be used to select and retrieve all of the electronic content displayed on the interactive display device 102. In some aspects, selecting the "Capture Notebook" command can configure the mobile device to generate and transmit configuration data to the interactive display device 102 that instructs the interaction application 202 to respond to a subsequently received touch input by selecting some or all electronic content that is displayed on the interactive display device 102 and transmitting the selected content to the mobile device. The interaction application 202 can respond to receiving the configuration data by responding to a subsequently received touch by transmitting some or all of the electronic content displayed on the interactive display device 102 to the mobile device. In additional or alternative aspects, selecting the "Capture Notebook" command can configure the mobile device to generate and transmit configuration data to the interactive display device 102 that instructs the interaction application 202 to respond to a subsequently received touch input by selecting a set of electronic content corresponding to a portion of the electronic content that is displayed on the interactive display device 102 and transmitting the selected content to the mobile device. The interaction application 202 can respond to receiving the configuration data by responding to a subsequently received touch by transmitting the set of electronic content to the mobile device. For example, a user may zoom in on a certain portion of electronic content on the interactive display device 102. The "Capture Notebook" command can be used to retrieve both the zoomed in portion of the electronic content as well as other portions of the electronic content that are not displayed on the interactive display device 102. Transmitting data from the interactive display device 102 to the mobile device may include directly transmitting the data (e.g., via one of the links 106a, 106b) or transmitting the data via a server 110.

Figure 8:
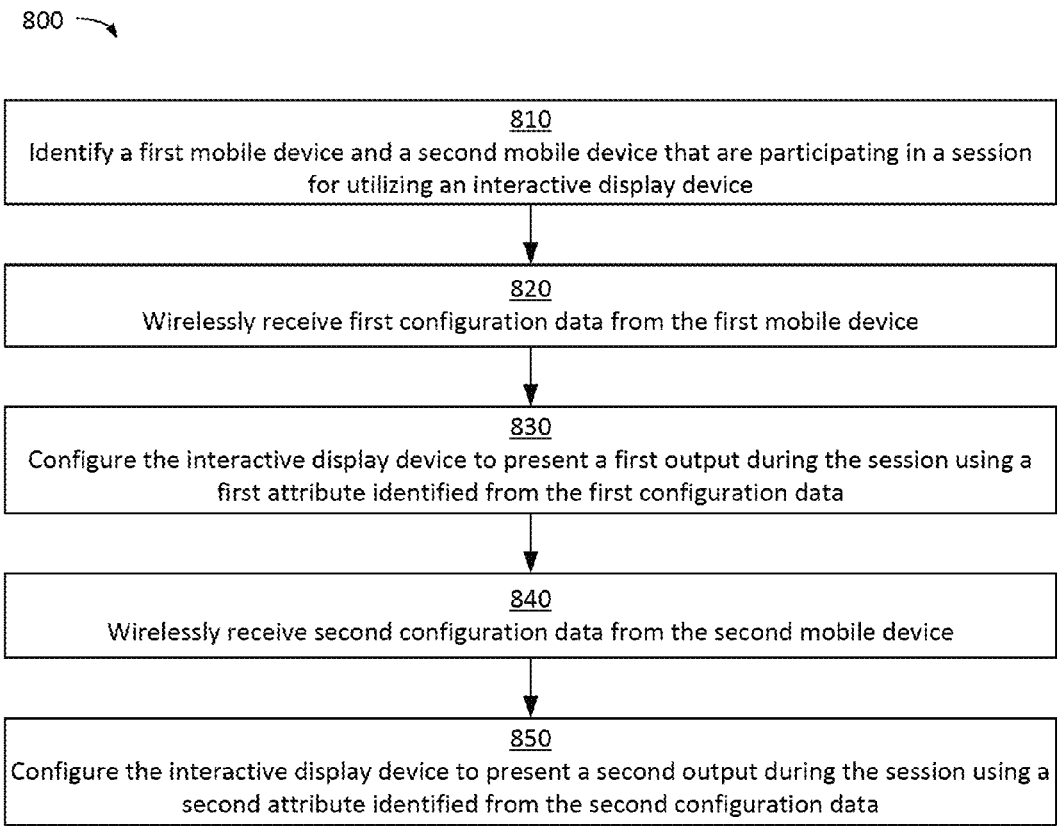
FIG. 8 is a flow chart depicting an example of a method for configuring an interactive display device for displaying outputs associated with users of multiple mobile devices based on configuration data received from the mobile devices according to certain aspects of the present invention.

FIG. 8 is a flow chart depicting an example of a method 800 for configuring an interactive display device 102 to display outputs associated with users of multiple mobile devices 104a, 104b, 104c based on configuration data received from the mobile devices 104a, 104b, 104c. For illustrative purposes, the method 800 is described with reference to the devices depicted in FIGS. 1 and 2. Other implementations, however, are possible.

The method 800 involves identifying at least a first mobile device 104a and a second mobile device 104b that are participating in a session for utilizing an interactive display device 102, as shown in block 810. A processing device that is included in or communicatively coupled to the interactive display device 102 can execute suitable program code to identify the mobile devices 104a, 104b. In some aspects, the processing device can be included in the interactive display device 102. The program code can include the interaction application 202. In additional or alternative aspects, the processing device can be included in the interaction object 103. The program code can be stored in a non-transitory computer-readable medium of the interaction object 103.

Any suitable process can be executed by a processing device to identify mobile devices that are participating in a session. In some aspects, a user associated with the mobile device 104a can cause a communication link to be established between the mobile device 104a and the interactive display device 102. In additional or alternative aspects, the user can cause a communication link to be established between the mobile device 104a and an active interaction object 103 that includes a transceiver and a processing device. Causing the communication link to be established may include using an interface displayed on the interactive display device 102 to initiate a link with the interactive display device 102 and/or the interaction object 103. The interactive display device 102 can respond to a command received via the interface by displaying link data that can be inputted into the mobile device 104a. The link data can include information that may be used by the mobile device 104a to perform one or more operations for establishing the link. Non-limiting examples of link data include an authentication code that can be scanned with an imaging device of the mobile device 104a, an authentication code that can be typed into the mobile device 104a, an identifier of a server 110 (e.g., a hyperlink) that is in communication with the interactive display device 102 and that can be accessed by the mobile device, etc.

In some aspects, the interaction application 202 or other suitable program code can include an authentication algorithm. The authentication algorithm can be executed to authenticate each of the mobile devices 104a, 104b. The authentication algorithm can update a file stored in a non-transitory computer-readable medium that identifies mobile devices that have been authenticated or otherwise authorized for using the interactive display device 102 during a session.

The method 800 further involves wirelessly receiving first configuration data from the first mobile device, as shown in block 820. For example, a processing device can execute the interaction application 202 or other suitable program code to control the operation of a wireless transceiver. The wireless transceiver can be used to communicate with mobile devices via any suitable communication protocol (e.g., Bluetooth, Wi-Fi, etc.). In some aspects, the processing device and wireless transceiver can be included in or communicatively coupled to the interactive display device 102. In additional or alternative aspects, the processing device and wireless transceiver can be included in or communicatively coupled to the interaction object 103.

In some aspects, the interaction application 202 executed at the interactive display device 102 or another application executed by another device can instruct or otherwise cause a mobile device to transmit configuration data to the interactive display device 102. In one non-limiting example, a user of the interactive display device 102 may use an appropriate interface displayed at the interactive display device 102 or another computing device to identify another user who will subsequently use the interactive display device 102 (e.g., a teacher selecting a student to answer a question displayed on the interactive display device 102). The interaction application 202 can respond to receiving a selection of a user by executing an algorithm to identify a mobile device associated with the selected user. For example, the interaction application 202 can reference data stored in a non-transitory computer-readable medium to determine that a mobile device 104a involved in a session is associated with the selected user. The interaction application 202 can configure a wireless transceiver of the interactive display device 102 to transmit a message to the identified mobile device 104a.

In another non-limiting example, a processing device in communication with a proximity detection device can execute an algorithm for identifying a mobile device that is within a certain proximity to the proximity detection device. The proximity detection device may be included in one or more of the interactive display device 102, the interaction object 103, or another device co-located with the interactive display device 102. The processing device may be included in or communicatively coupled to one or more of the interactive display device 102, the interaction object 103, or another device co-located with the interactive display device 102. In some aspects, the processing device can respond to the identification of the mobile device by accessing configuration data that is associated with the identified mobile device and that is stored in a non-transitory computer-readable medium accessible to the processing device. The processing device can configure the interactive display device 102 such that subsequent interactions with the interactive display device 102 utilize the accessed configuration data. In additional or alternative aspects, the processing device can respond to the identification of the mobile device by configuring a wireless transceiver of the interactive display device 102, the interaction object 103, or another device to transmit a message to the identified mobile device for obtaining configuration data. In some aspects, the message for obtaining configuration data can be transmitted to the identified mobile device based on the processing device being unable to find previously obtained configuration data for the mobile device.

In some aspects, a message transmitted to a mobile device for obtaining configuration data can include a notification that the mobile device 104a has been selected. The mobile device 104a can display or otherwise present the notification. A user of the mobile device can respond to the notification by using the configuration application 204a to select, enter, or otherwise generate configuration data and transmit the configuration data to the interactive display device 102. In additional or alternative aspects, the message can include a request to transmit configuration data to the interactive display device 102. A user of the mobile device can respond to the request by using the configuration application 204a to select, enter, or otherwise generate configuration data and transmit the configuration data to the interactive display device 102. In additional or alternative aspects, the message can include a command to the configuration application 204a to transmit configuration data to the interactive display device 102. The configuration application 204a can respond to the command by retrieving configuration data from a non-transitory computer-readable medium of the mobile device 104a and configuring the mobile device 104a to transmit the configuration data to the interactive display device 102. The configuration application 204a can do so automatically without requiring additional inputs from an input device of the mobile device 104a.

In some aspects, an active interaction object 103 may include a non-transitory computer-readable medium that can store multiple sets of configuration data associated with respective entities (i.e., specific users, specific mobile devices, etc.). The active interaction object 103 can include one or more components for accessing different sets of configuration data. Non-limiting examples of such components include a display device and buttons for scrolling through different sets of configuration data associated with different entities, one or more buttons for scrolling through different sets of configuration data associated with different entities, one or more buttons for selecting specific entity profiles (e.g., three buttons for selecting one of three stored sets of configuration data). A given user who has previously provided configuration data to the active interaction object can access his or her configuration data upon picking up the interaction object 103.

In some aspects, the interactive display device 102 or the interaction object 103 can transmit a message to the mobile device 104a that includes information about the current configuration settings of the interactive display device 102 or the interaction object 103 (e.g., a given drawing tool being used or a given color being used). A user of the mobile device 104a can decide either to use the current configuration settings of the interactive display device 102 or to transmit configuration data to one or more of the interactive display device 102 or the interaction object 103 that specifies changes to one or more of the configuration settings. One or more of the interactive display device 102 and the interaction object 103 can receive the configuration data and change one or more of the configuration settings based on the received configuration data.

The method 800 further involves configuring the interactive display device 102 to present a first output during the session using a first attribute identified from the first configuration data, as shown in block 830. A processing device can execute the interaction application 202 or other suitable program code to present the outputs. In some aspects, presenting the first output using the first attribute can include presenting the output with a visual attribute specified by or otherwise identifiable from the first configuration data. Non-limiting examples of presenting the outputs with a visual attribute include executing a drawing function using a given color, executing a drawing function using a dimension (e.g., the width of a line being drawn), displaying an object having given shape or other dimension, generating and displaying specific text content, displaying text with given textual attributes (e.g., font, style, etc.), etc.

In some aspects, the interactive display device 102 can be configured to present the output in response to the processing device receiving an input from the interaction object 103 during the session. For example, interactive display device 102 can display electronic content (e.g., drawing inputs, objects, text, etc.) with one or more visual attributes determined from the configuration data (e.g., color, dimension, position, etc.) in response to receiving a touch input or other input from the interaction object 103 subsequent to receiving the configuration data.

In additional or alternative aspects, a processing device that is included or communicatively coupled to an interaction object 103 can be used to configure the interactive display device 102. For example, the processing device can configure an illumination source or other transmitter of the interaction object 103 to transmit or otherwise emit a signal. The signal can instruct the interactive display device 102 to present the output. The signal can be generated based on the configuration data that is received from a mobile device.

In some aspects, the interaction application 202 or other suitable program code can be executed by a processing device to associate the presented outputs with a specific user. The processing device can be included in or communicatively coupled to one or more of the interactive display device 102, the interaction object 103, the server 110, and/or another suitable computing device or system. A non-limiting example of associating outputs with a user includes storing each output event (e.g., drawing strokes, typed letters, etc.) in a database or other data structure on a non-transitory computer-readable medium. Each of the stored output events can be associated with a unique identifier for a user or a mobile device associated with a user. Associating different outputs with different users can allow for distinguishing between different contributions to a collaborative project by different users. For example, the interactive display device 102 can be configured to present each of multiple outputs associated with a first user to visually depict the first user's contribution and to separately present each of multiple outputs associated with a second user to visually depict the second user's contribution.

Configuration data generated by each of the configuration applications 204a, 204b, 204c can be used by the interaction application 202 or other suitable application to identify a given user of an interaction object 103. For example, each of the mobile devices 104a, 104b, 104c can be associated with unique identification data. The identification data can identify one or both of the mobile devices and a user of the mobile device. Non-limiting examples of identifiers for a mobile device include a network address, a phone number, a hardware identifier, etc. Non-limiting examples of identifiers for a user include a username or other credential used to access the mobile device, an identifier that is assigned to a user of the mobile device by the interaction application 202 in response to establishing a session with the mobile device, etc.

In some aspects, each of the configuration applications 204a, 204b, 204c can include the identification data in configuration data generated by the configuration application. The interaction application 202 or other suitable application can reference the identification data in the received configuration data. The referenced identified data can be used to determine which user is to be associated with inputs that are received by the interactive display device 102 subsequent to the receipt of the configuration data.

In additional or alternative aspects, one or more of the configuration applications 204a, 204b, 204c can include a reference to the identification data in the configuration data (e.g., an identifier for a record in a database in which the identification data is stored). The interaction application 202 or other suitable application can use the reference to retrieve the identification data from a non-transitory computer-readable medium. The processing device can use the retrieved identification data to determine which user is to be associated with inputs that are received by the interactive display device 102 subsequent to the receipt of the configuration data.

The method 800 further involves wirelessly receiving second configuration data from the second mobile device 104b, as shown in block 840. A processing device that is included in or communicatively coupled to one or more of the interactive display device 102 and the interaction object 103 can execute the interaction application 202 or other suitable program code to receive the second configuration data. For example, one or more of the interactive display device 102 and the interaction object 103 can receive configuration data from a mobile device 104*b* in a manner similar to one or more of the aspects and examples described above with respect to block 820 and mobile device 104*a*.

The method 800 further involves configuring the interactive display device to present a second output during the session using a second attribute identified from the second configuration data, as shown in block 850. In some aspects, presenting the second output using the second attribute can include presenting the output with a visual attribute specified by or otherwise identifiable from the second configuration data. The processing device of the interactive display device 102 can execute the interaction application 202 or other suitable program code to present and associate outputs based on the second configuration data in a manner similar to the description above with respect to block 850.

Although the description of blocks 830 and 850 involves displaying or otherwise presenting outputs subsequent to receiving configuration data, other operations using the received configuration data can be performed by the interactive display device 102. For example, as described above with respect to FIG. 7, a configuration application executed by a mobile device can retrieve data using the interactive display device 102 (e.g., by sending a "capture object" or "capture selection" command). The interaction application 202 can respond to a touch input by performing a command specified in the configuration data. For example, if the configuration data includes a "capture object" command, the interactive display device 102 can respond to a touch input by selecting a displayed object or other electronic content using the touch input. The interactive display device 102 can transmit the selected object or other electronic content to a mobile device or other target device that is identified using the received configuration data.

In some aspects, the received configuration data can instruct the interactive display device 102 (or another computing device that is communicatively coupled to the interactive display device 102) to transmit the selected object or other electronic content to the mobile device from which the configuration data was received. In additional or alternative aspects, the received configuration data can instruct the interactive display device 102 to transmit the selected object or other electronic content to a target computing device that is different from the mobile device from which the configuration data was received. The target device can be associated with an address or other identifier. The address or other identifier can be determined by a processing device using the received configuration data. For example, the interactive display device 102 or another computing device that is communicatively coupled to the interactive display device 102 can transmit a selected object or other electronic content to an e-mail address or other network address that is specified in or otherwise determined from the configuration data.

In additional or alternative aspects, the interaction application 202 can use configuration data received from one or more mobile devices 104*a*, 104*b*, 104*c* to mediate or otherwise manage control of the interactive display device 102. For example, the interactive display device 102 and the mobile devices 104*a*, 104*b*, 104*c* can be used by participants in a meeting, such as (but not limited to) a teacher and students in a classroom. A first user, such as the teacher, may use the interactive display device 102 to write a question on the board. Several students may use the mobile devices 104*a*, 104*b*, 104*c* to request control of the interactive display device 102 for answering the question. For example, configuration data received from the mobile devices 104*a*, 104*b*, 104*c* can include requests for the interaction application 202 to use data transmitted from the configuration applications 204*a*, 204*b*, 204*c* (e.g., visual attributes for drawing inputs, text that is transmitted from a given mobile device, etc.). In some aspects, the interaction application 202 can respond to these requests by automatically selecting one of the mobile devices 104*a*, 104*b*, 104*c* and using configuration data from the selected device to configure the interactive display device 102. For example, the interaction application 202 may provide control of the interactive display device 102 to the user of the mobile device that first transmitted a request for control. In additional or alternative aspects, the interaction application 202 can respond to these requests by configuring the interactive display device 102 to display an interface for selecting one of the mobile devices 104*a*, 104*b*, 104*c* or one of the users of the mobile devices 104*a*, 104*b*, 104*c*. The interaction application 202 can respond to an input received via the interface (e.g., a teacher selecting one of the requesting students) by using the configuration data from the selected mobile device to configure the interactive display device 102.

In additional or alternative aspects, configuration data generated by each of the configuration applications 204*a*, 204*b*, 204*c* can be used by the interaction application 202 to identify permissions associated with a given user of an interaction object 103. For example, the interaction application 202 can determine which permissions are associated with a given user by referencing a database or other suitable data structure stored in a non-transitory computer-readable medium that is included in or accessible to the interactive display device 102. The interaction application 202 can identify a given set of permissions corresponding to identification data that is included in or retrieved using configuration data received from one of the mobile devices 104*a*, 104*b*, 104*c*. In a non-limiting example, the interaction application 202 can allow different users to utilize the interactive display device 102 to access different data or perform different functions during a common session based on which user (i.e., which of the mobile devices 104*a*, 104*b*, 104*c*) has control of the interactive display device 102. Allowing different users to utilize the interactive display device 102 to access different data or perform different functions during the same session can obviate the need for different users to log in or log out of an interaction application each time a different user assumes control of the interactive display device 102, thereby minimizing or otherwise reducing the amount of time required for different users to collaboratively work with electronic content via the interactive display device 102.

Although one or more operations involving multiple mobile devices are described above with respect to FIG. 8, other implementations are possible. For example, in some aspects, block 810 can involve identifying a single mobile device that is participating in a session for utilizing the interactive display device 102 and blocks 840, 850 can be omitted.

Figure 9:
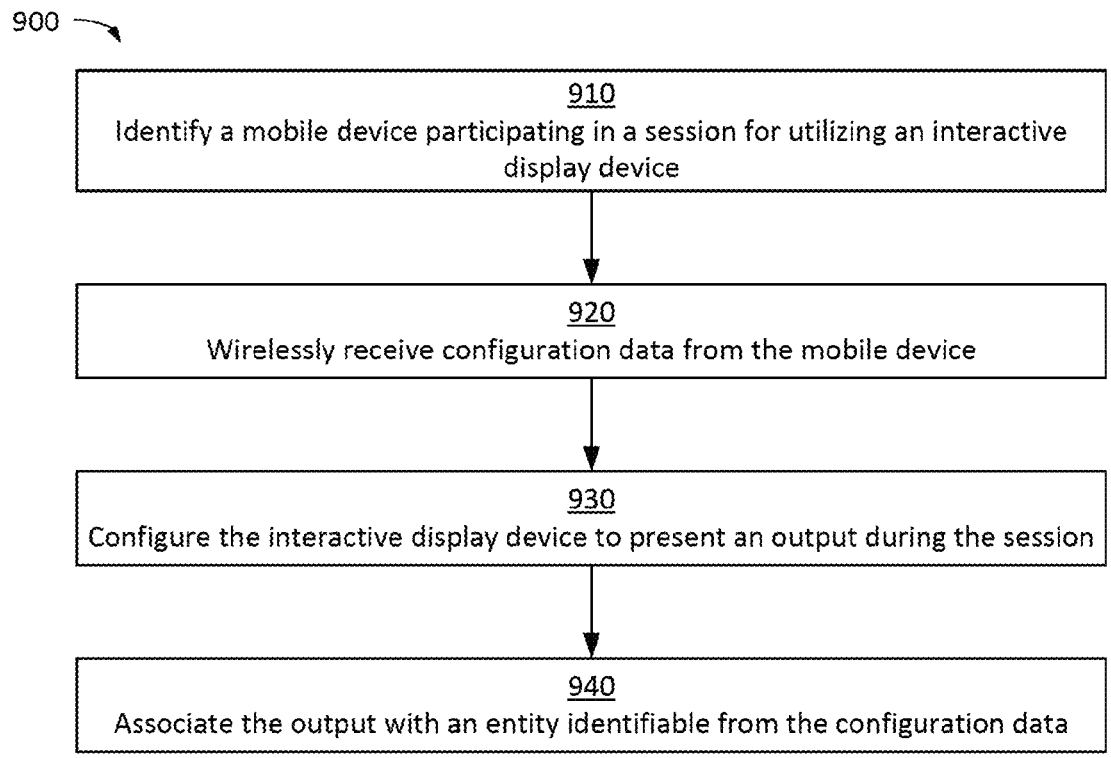
FIG. 9 is a flow chart depicting an example of a method for associating outputs presented by an interactive display device with a mobile device or a user of a mobile device based on configuration data received from the mobile device according to certain aspects of the present invention.

FIG. 9 is a flow chart depicting an example of a method 900 for associating outputs presented by an interactive display device 102 with a mobile device or a user of a mobile device based on configuration data received from the mobile device. For illustrative purposes, the method 900 is described with reference to the devices depicted in FIGS. 1 and 2. Other implementations, however, are possible.

The method 900 involves identifying at least one mobile device that is participating in a session for utilizing an interactive display device 102, as shown in block 910. A processing device that is included in or communicatively coupled to the interactive display device 102 can execute suitable program code to identify the mobile device. In some aspects, the processing device can be included in the interactive display device 102. The program code can include the interaction application 202. In additional or alternative aspects, the processing device can be included in the interaction object 103. The program code can be stored in a non-transitory computer-readable medium of the interaction object 103. Any suitable process can be executed by a processing device in a manner similar to one or more aspects described above with respect to block 810 of method 800 to identify mobile devices that are participating in a session.

The method 900 further involves wirelessly receiving configuration data from the mobile device, as shown in block 920. For example, a processing device can execute the interaction application 202 or other suitable program code to control the operation of a wireless transceiver. The wireless transceiver can be used to communicate with mobile devices via any suitable communication protocol (e.g., Bluetooth, Wi-Fi, etc.). In some aspects, the processing device and wireless transceiver can be included in or communicatively coupled to the interactive display device 102. In additional or alternative aspects, the processing device and wireless transceiver can be included in or communicatively coupled to the interaction object 103. Any suitable process can be executed by a processing device in a manner similar to one or more aspects described above with respect to block 820 of method 800 to obtain configuration data from a mobile device.

In some aspects, the interaction application 202 executed at the interactive display device 102 or another application executed by another device can instruct or otherwise cause a mobile device to transmit configuration data to the interactive display device 102. The interaction application 202 can do so in a manner similar to one or more aspects described above with respect to block 820 of method 800.

In additional or alternative aspects, an active interaction object 103 may include a non-transitory computer-readable medium that can store multiple sets of configuration data associated with respective entities (i.e., specific users, specific mobile devices, etc.). As described above with respect to block 820 of method 800, a given user who has previously provided configuration data to the active interaction object can access his or her configuration data upon picking up the interaction object 103.

In some aspects, the interactive display device 102 or the interaction object 103 can transmit a message to the mobile device that includes information about the current configuration settings of the interactive display device 102 or the interaction object 103 (e.g., a given drawing tool being used or a given color being used). The interaction application 202 can do so in a manner similar to one or more aspects described above with respect to block 820 of method 800. A user of the mobile device can decide either to use the current configuration settings of the interactive display device 102 or to transmit configuration data to one or more of the interactive display device 102 or the interaction object 103 that specifies changes to one or more of the configuration settings. One or more of the interactive display device 102 and the interaction object 103 can receive the configuration data and change one or more of the configuration settings based on the received configuration data.

The method 900 further involves configuring the interactive display device 102 to present an output during the session, as shown in block 930. A processing device can execute the interaction application 202 or other suitable program code to present the outputs. The processing device can do so in a manner similar to one or more of the aspects described above with respect to block 830 of method 800. In some aspects, presenting the output can involve displaying the output with a visual attribute identifiable from the configuration data. Non-limiting examples of such attributes are described above with respect to FIGS. 3-8.

The method 900 further involves associating the output with an entity identifiable from the configuration data, as shown in block 940. A processing device can execute the interaction application 202 or other suitable program code to associate one or more outputs with one or more entities identifiable from configuration data. In some aspects, an entity identifiable from configuration data can be a mobile device from which the configuration data was received. In additional or alternative aspects, an entity identifiable from configuration data can be a user of a mobile device from which the configuration data was received.

In some aspects, the interaction application 202 or other suitable program code can be executed by a processing device to associate the presented outputs with a specific user. A non-limiting example of associating outputs with a user includes storing each output event (e.g., drawing strokes, typed letters, etc.) in a database or other data structure on a non-transitory computer-readable medium. Each of the stored output events can be associated with a unique identifier for a user or a mobile device associated with a user. Associating different outputs with different users can allow for distinguishing between different contributions to a collaborative project by different users. For example, the interactive display device 102 can be configured to present each of multiple outputs associated with a user to visually depict the user's contribution and to separately present each of multiple outputs associated with a second user to visually depict the second user's contribution.

As described above with respect to method 800, configuration data generated by each of the configuration applications 204a, 204b, 204c can be used by the interaction application 202 or other suitable application to identify a given user of an interaction object 103. For example, each of the mobile devices 104a, 104b, 104c can be associated with unique identification data. The identification data can identify one or both of the mobile devices and a user of the mobile device. In some aspects, each of the configuration applications 204a, 204b, 204c can include the identification data in configuration data generated by the configuration application. The interaction application 202 or other suitable application can reference the identification data in the received configuration data. The referenced identified data can be used to determine which user is to be associated with inputs that are received by the interactive display device 102 subsequent to the receipt of the configuration data. In additional or alternative aspects, one or more of the configuration applications 204a, 204b, 204c can include a reference to the identification data in the configuration data (e.g., an identifier for a record in a database in which the identification data is stored). The interaction application 202 or other suitable application can use the reference to retrieve the identification data from a non-transitory computer-readable medium. The processing device can use the retrieved identification data to determine which user is to be associated with inputs that are received by the interactive display device 102 subsequent to the receipt of the configuration data.

The method 900 is described above with respect to one mobile device for illustrative purposes. However, other implementations are possible. For example, configuration data from multiple mobile devices can be used to associate different outputs with different entities.

Figure 10:
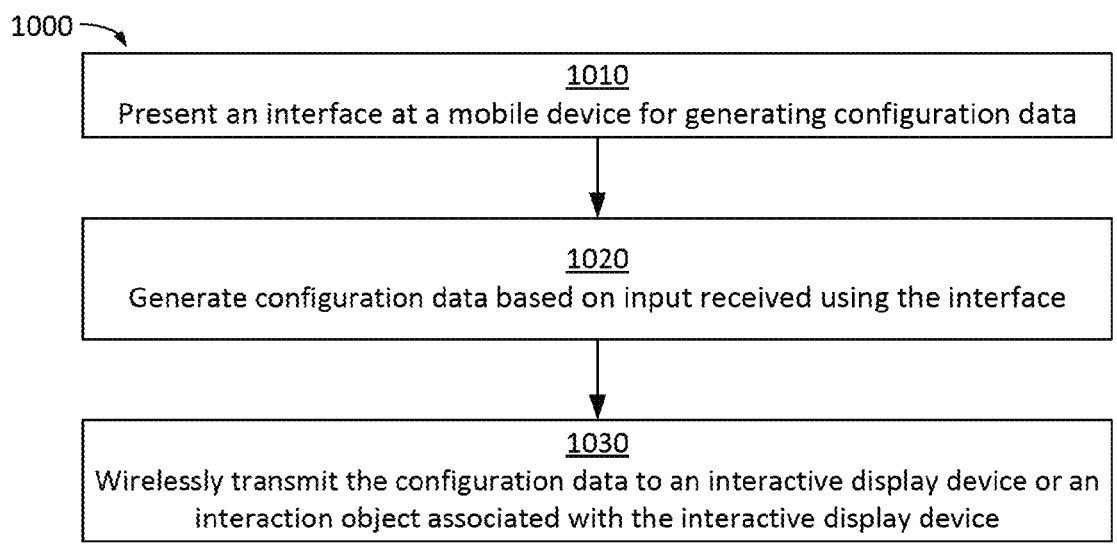
FIG. 10 is a flow chart depicting an example of a method for using a mobile device to generate configuration data for configuring an interactive display device according to certain aspects of the present invention.

FIG. 10 is a flow chart depicting an example of a method 1000 for using a mobile device to generate configuration data for configuring an interactive display device 102. For illustrative purposes, the method 1000 is described with reference to the devices depicted in FIGS. 1 and 2. Other implementations, however, are possible.

The method 1000 involves presenting an interface at a mobile device for generating configuration data, as shown in block 1010. For example, a processing device of one of the mobile devices 104a, 104b, 104c can execute a respective one of the configuration applications 204a, 204b, 204c or other suitable program code stored in a non-transitory computer-readable medium of the mobile device to present an interface. In some aspects, presenting an interface can include configuring a display device of the mobile device to display an interface, such as (but not limited to) one of the interfaces depicted in FIGS. 3-7, that solicits input from a user for generating configuration data. In additional or alternative aspects, presenting an interface can include configuring other components of the mobile device to output sensory data (e.g., outputting audio prompts via a speaker) that solicits input from a user for generating configuration data.

The method 1000 involves generating configuration data based on input that is obtained using the interface, as shown in block 1020. For example, a processing device of one of the mobile devices 104a, 104b, 104c can execute a respective one of the configuration applications 204a, 204b, 204c or other suitable program code stored in a non-transitory computer-readable medium of the mobile device to generate the configuration data. In some aspects, generating the configuration data using the interface can include using touch screen inputs received via the interface to generate the configuration data. For example, one or more of the interfaces depicted in FIGS. 3-7 can be used to enter, select, or otherwise generate configuration data. In additional or alternative aspects, generating the configuration data using the interface can include using information provided by a user in response to the interface being presented (e.g., using commands spoken by a user in response to visual or audio prompts outputted by the mobile device).

In some aspects, one or more of the configuration applications 204a, 204b, 204c can generate configuration data that identifies one or more attributes of the interaction object 103. For example, a configuration application can determine whether an interaction object 103 is a stylus, a finger, an eraser, or another type of interaction object. The configuration application can transmit the configuration data identifying the interaction object 103 to the interactive display device 102. The interaction application 202 can generate outputs in response to subsequent inputs from the interaction object 103 that are customized to the type of interaction object (e.g., executing a text recognition algorithm for inputs received from a stylus, executing a drawing function for inputs received from a finger, executing an "erase" function for inputs received from an eraser, etc.). In some aspects, the configuration data generated by a configuration application executed at a mobile device can specify how inputs from different types of interaction objects are to be used by the interaction application 202 to generate different types of outputs. For example, a user of a mobile device can use the interaction application 202 to specify that inputs received from a first interaction object (e.g., a stylus) are to be used in a first way (e.g., by executing a text recognition algorithm on the inputs) and that inputs received from a second interaction object (e.g., a finger) are to be used in a second way (e.g., by executing a drawing function based on the inputs).

In some aspects, one or more of the configuration applications 204a, 204b, 204c can determine a dimension of the interaction object 103 based on a touch input received by a mobile device. For example, the mobile device can determine that an object touching a touchscreen or touchpad has a given dimension (e.g., less than two millimeters, more than half an inch, more than three inches, etc.). The configuration application can identify the type of interaction object 103 based on the dimension. For example, an interaction object 103 can be identified as a stylus based on having a width of less than two millimeters, can be identified as a finger based on having a width of more than half an inch and less than two inches, or can be identified as an eraser based on having a width of more than three inches.

In additional or alternative aspects, one or more of the configuration applications 204a, 204b, 204c can determine a shape of the interaction object 103 based on an image of the interaction object. For example, a mobile device can include or be communicatively coupled to a camera or other imaging device. The camera or other imaging device can be used to capture an image of the interaction object 103. A configuration application executed by the mobile device can perform an object recognition algorithm that uses the captured image. The object recognition algorithm can identify the type of interaction object 103 (e.g., finger, stylus, eraser, etc.) based on a shape of the interaction object that is determined from the capture image.

The method 1000 involves wirelessly transmitting the configuration data to an interactive display device 102 or an interaction object 103 associated with the interactive display device 102, as shown in block 1030. For example, a processing device of one of the mobile devices 104a, 104b, 104c can execute a respective one of the configuration applications 204a, 204b, 204c or other suitable program code stored in a non-transitory computer-readable medium of the mobile device to configure a wireless transceiver of the mobile device to transmit the configuration data.

In some aspects, the mobile device can transmit the configuration data to the interactive display device 102. In additional or alternative aspects, the mobile device can transmit the configuration data to the interaction object 103. For example, the interaction object 103 may include a wireless transceiver, a processing device, and program code stored in a non-transitory computer-readable medium. In some aspects, the interaction object 103 can transmit commands to the interactive display device 102 that cause the interactive display to perform one or more functions (e.g., displaying drawing outputs). The interaction object 103 can generate the commands based on configuration data received from a mobile device. In additional or alternative aspects, the interaction object 103 can emit illumination that is detectable by the interactive display device 102. The illumination can have different attributes (e.g., color, frequency, pattern, etc.) that correspond to different inputs to be provided to the interactive display device 102. The interaction object 103 can select one or more attributes of the emitted illumination based on configuration data received from a mobile device.

Figure 11:
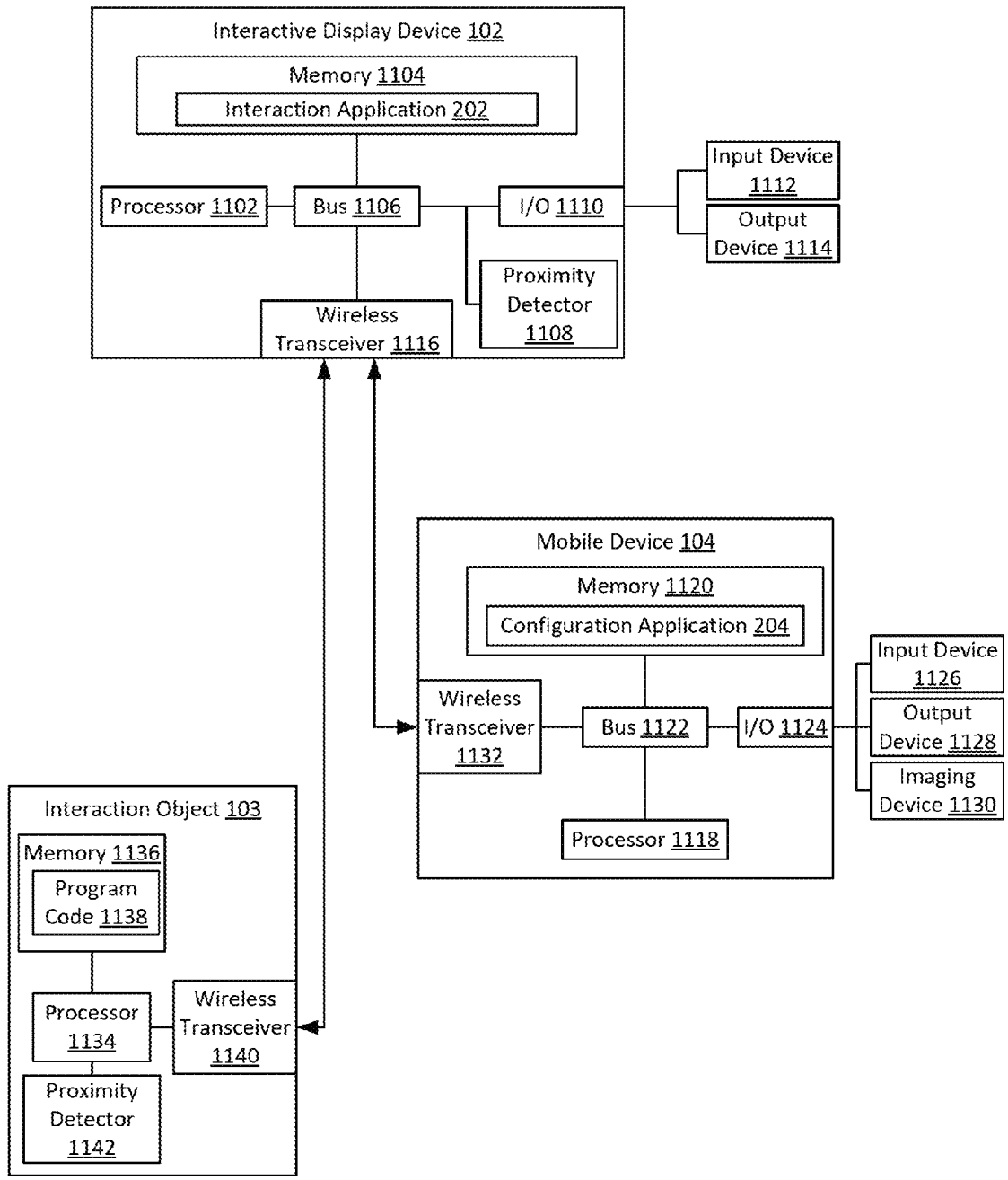
FIG. 11 is a block diagram depicting examples of an interactive display device, an interaction object, and a mobile device that can communicate with one or both of the interactive display device and the interaction object according to certain aspects of the present invention.

Any suitable system implementation can be used for the devices and methods described above with respect to FIGS. 1-10. For example, FIG. 11 is a block diagram depicting examples of an interactive display device 102, an interaction object 103, and a mobile device 104 that can communicate with one or both of the interactive display device 102 and the interaction object 103.

The interactive display device 102, the mobile device 104, and the interaction object 103 can respectively include processors 1102, 1118, 1134 that are communicatively coupled to respective memory devices 1104, 1120, 1136. The processors 1102, 1118, 1134 can execute computer-executable program code and/or access information stored in the memory devices 1104, 1120, 1136. The processor 1102 can execute an interaction application 202 and/or other computer-executable program code stored in the memory device 1104. The processor 1118 can execute a configuration application 204 and/or other computer-executable program code stored in the memory device 1120. The processor 1134 can execute computer-executable program code 1138 stored in the memory device 1120. When executed by the processors 1102, 1118, 1134 the program code stored in the memory devices 1104, 1120, 1136 can cause the processor to perform the operations described herein. Each of the processors 1102, 1118, 1134 may include a microprocessor, an application-specific integrated circuit ("ASIC"), a state machine, or other processing device. Each of the processors 1102, 1118 can include any of a number of processing devices, including one.

Each of the memory devices 1104, 1120, 1136 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read program code. The program code may include processor-specific instructions generated by a compiler and/or an interpreter from code written in any suitable computer-programming language, including, for example, C, C++, C#, Visual Basic, Java, Python, Perl, JavaScript, and ActionScript.

The interactive display device 102 and the mobile device 104 can also respectively include buses 1106, 1122. Each of the buses 1106, 1122 can communicatively couple one or more components of a respective one of the interactive display device 102 and the mobile device 104.

In some aspects, the interactive display device 102 can include a proximity detector 1108 that is communicably coupled to the processor 1102. In additional or alternative aspects, the interaction object 103 can include a proximity detector 1142 that is communicably coupled to the processor 1134. In additional or alternative aspects, one or both of the interactive display device 102 and the interaction object 103 may omit a proximity detector. In additional or alternative aspects, one or both of the proximity detectors 1108, 1142 may be included in a device separate from the interactive display device 102 or the interaction object 103.

In some aspects, one or both of the proximity detectors 1108, 1142 can include one or more sensors or other devices configured to detect a mobile device. One or both of the proximity detectors 1108, 1142 can be configured to uniquely identify a mobile device. In additional or alternative aspects, one or both of the proximity detectors 1108, 1142 can be implemented as software modules that are executable by a suitable processing device.

The interactive display device 102 and the mobile device 104 can also respectively include a number of external or internal devices. For example, the interactive display device 102 and the mobile device 104 can include input/output ("I/O") interfaces 1110, 1124. Each of the I/O interfaces 1110, 1124 can communicate input events and output events among components of the interactive display device 102 and the mobile device 104, respectively. For example, the interactive display device 102 can include one or more input devices 1112 and one or more output devices 1114 and the mobile device 104 can include one or more input devices 1126 and one or more output devices 1128. The one or more input devices 1112, 1126 and one or more output devices 1114, 1128 can be communicatively coupled to the I/O interfaces 1110, 1124, respectively. The communicative coupling can be implemented via any suitable manner (e.g., a connection via a printed circuit board, connection via a cable, communication via wireless transmissions, etc.). Non-limiting examples of input devices 1112, 1126 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 1114, 1128 include an LCD screen, an external monitor, a speaker, or any other device that can be used to display or otherwise present outputs generated by a computing device.

For illustrative purposes, FIG. 11 depicts input devices 1112, 1126 and output devices 1114, 1128 as separate devices external to the interactive display device 102 and the mobile device 104. However, any suitable implementation of an interactive display device 102 and/or a mobile device 104 with respect to the input devices 1112, 1126 and output devices 1114, 1128 can be used. For example, a device such as a touch screen can be integrated with or communicatively coupled to a computing device. A touch screen can function as both an input device and an output device.

In some aspects, the mobile device 104 can also include an imaging device 1130. A non-limiting example of an imaging device 1130 is a camera having an energy source, such as a light emitting diode ("LED"), and an optical sensor. An imaging device 1130 can include other optical components, such as an imaging lens, imaging window, an infrared filter, and an LED lens or window. In some aspects, the imaging device 1130 can be a separate device configured to communicate with the mobile device 104 via the I/O interface 1124. In other aspects, the imaging device 1130 can be integrated with the mobile device 104.

The interactive display device 102 can also include one or more wireless transceivers 1116, the mobile device 104 can include one or more wireless transceivers 1132, and the interaction object 103 can include one or more wireless transceivers 1140. The wireless transceivers 1116, 1132 can include any device or group of devices suitable for establishing a wireless data connection. Non-limiting examples of the wireless transceivers 1116, 1132 include one or more of an Ethernet network adapter, an RF transceiver, a modem, an optical emitter, an optical transceiver, etc.

Although, for illustrative purposes, FIG. 11 depicts the processor 1102, the memory device 1104, the bus 1106, the I/O interface 1110, the input device 1112, the output device 1114, and the wireless transceiver 1116 as being included within the interactive display device 102, other implementations are possible. For example, in some aspects, one or more of the processor 1102, the memory device 1104, the bus 1106, the I/O interface 1110, the input device 1112, the output device 1114, and the wireless transceiver 1116 can be separate devices that are communicatively coupled with one or more other components of the interactive display device 102. In additional or alternative aspects, one or more of the processor 1102, the memory device 1104, the bus 1106, the I/O interface 1110, the input device 1112, the output device 1114, and the wireless transceiver 1116 can be included in a separate computing device (e.g., a server 110) that is communicatively coupled with one or more other components of the interactive display device 102.

In some aspects, a computing system or environment can include at least one interactive display device 102. In additional or alternative aspects, a system can be formed by establishing communication between at least one interactive display device 102 and multiple mobile devices 104. In additional or alternative aspects, a system can be formed by establishing communication between at least one interactive display device 102, at least one interaction object 103, and multiple mobile devices 104.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

In the figures described above, the numbers of devices depicted or described (e.g., interactive display devices, mobile devices, interaction objects or other pointer devices, etc.) are used for illustrative purposes only. Other implementations are possible. For example, any number of interactive display devices, mobile devices, interaction objects or other pointer devices, or any other device or component described above may be used to implement the subject matter described herein.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific examples thereof, it will be appreciated that those skilled in the art, upon attaining an understanding of the foregoing may readily produce alterations to, variations of, and equivalents to such aspects and examples. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
identifying, by a processing device, a first mobile device and a second mobile device participating in a session for utilizing an interactive display device that is communicatively coupled to the processing device;
receiving first configuration data from the first mobile device via a wireless transceiver that is communicatively coupled to the processing device;
configuring the interactive display device to present a first output using a first attribute during the session, wherein the processing device identifies the first attribute from the first configuration data;
receiving second configuration data from the second mobile device via the wireless transceiver;
configuring the interactive display device to present a second output using a second attribute during the session, wherein the processing device identifies the second attribute from the second configuration data; and
subsequent to receiving the second configuration data:
generating, during the session, data indicative of a selection of the first mobile device or a user associated with the first mobile device, wherein the data indicative of the selection is generated in response to an input received by the interactive display device; and
configuring, based on the data indicative of the selection, the interactive display device to present a third output using the first attribute identified from the first configuration data during the session.

2. The method of claim 1, wherein the processing device is included in the interactive display device, wherein the interactive display device presents the first output in response to the processing device receiving a first input from an interaction object during the session, wherein the interactive display device presents the second output in response to the processing device receiving a second input from the interaction object during the session.

3. The method of claim 1, wherein the processing device is included in an interaction object and wherein configuring the interactive display device to present at least one of the first output and the second output comprises emitting, by the interaction object, a signal that instructs the interactive display device to present at least one of the first output and the second output, wherein the signal is generated based on at least one of the first configuration data and the second configuration data.

4. The method of claim 1, wherein identifying the first mobile device and the second mobile device comprises authenticating the first mobile device and the second mobile device to access the interactive display device.

5. The method of claim 1, wherein configuring the interactive display device to present at least one of the first output using the first attribute and the second output using the second attribute comprises configuring the interactive display device to display a visual indicator that electronic content displayed on the interactive display device has been modified.

6. The method of claim 1, wherein configuring the interactive display device to present at least one of the first output using the first attribute and the second output using the second attribute comprises configuring the interactive display device to display a visual indicator that electronic content displayed on the interactive display device has been selected; and
further comprising transmitting the selected electronic content to a target device during the session.

7. The method of claim 6, wherein transmitting the selected electronic content comprises configuring the wireless transceiver to transmit the selected electronic content to an address of the target device, wherein the processing device determines the address from at least one of the first configuration data and the second configuration data.

8. The method of claim 1, wherein configuring the interactive display device to present at least one of the first output using the first attribute and the second output using the second attribute comprises at least one of:
configuring the interactive display device to display a drawing output with a visual attribute in response to a touchscreen input received by the interactive display device, wherein the visual attribute comprises at least one of a dimension or a color specified by at least one of the first configuration data and the second configuration data; and
configuring the interactive display device to display a text output with a text attribute based on the touchscreen input received by the interactive display device, wherein the text attribute comprises at least one of a font for the text output and a style for the text output.

9. The method of claim 1, further comprising:
receiving, by the processing device, electronic content from at least one of the first mobile device and the second mobile device; and
configuring the interactive display device to present at least some of the electronic content in response to the interactive display device receiving a touch input subsequent to the processing device receiving the electronic content.

10. The method of claim 9, wherein the electronic content comprises at least one of an object and text and wherein the interactive display device displays the at least one of the object and the text at a position corresponding to a location of the touch input.

11. The method of claim 1, wherein configuring the interactive display device to present the first output using the first attribute comprises configuring, during the session, the interactive display device to display first electronic content based on determining from the first configuration data that a first user is permitted to access the first electronic content; and
wherein configuring the interactive display device to present the second output using the second attribute comprises configuring, during the session, the interactive display device to display second electronic content based on determining from the second configuration data that a second user is permitted to access the second electronic content, wherein a first permission determined from the first configuration data permits access to different electronic content than a second permission determined from the second configuration data.

12. The method of claim 1, further comprising, subsequent to receiving the second configuration data:
determining, during the session, that the first mobile device is closer to a proximity detection device associated with the interactive display device than the second mobile device; and
configuring the interactive display device to present an additional output using the first attribute identified from the first configuration data during the session based on determining that the first mobile device is closer to the proximity detection device.

13. A system comprising:
a processing device;
a non-transitory computer-readable medium communicatively coupled to the processing device; and
a wireless transceiver communicatively coupled to the processing device,
wherein the processing device is configured for executing program code stored in the non-transitory computer-readable medium to perform operations comprising:
identifying a first mobile device and a second mobile device participating in a session for utilizing an interactive display device;
receiving first configuration data from the first mobile device via the wireless transceiver,
identifying a first attribute from the first configuration data;
configuring the interactive display device to present a first output using the first attribute during the session,
receiving second configuration data from the second mobile device via the wireless transceiver,
identifying a second attribute from the second configuration data,
configuring the interactive display device to present a second output using the second attribute during the session, and
subsequent to receiving the second configuration data:
generating, during the session and in response to an input received by the interactive display device, data indicative of a selection of the first mobile device or a user associated with the first mobile device; and
configuring, based on the data indicative of the selection, the interactive display device to present a third output using the first attribute identified from the first configuration data during the session.

14. A method comprising:
identifying, by a processing device, a mobile device participating in a session for utilizing an interactive display device that is communicatively coupled to the processing device;
receiving configuration data from the mobile device via a wireless transceiver that is communicatively coupled to the processing device;
configuring the interactive display device to present an output during the session;
associating, by the processing device, the output with an entity identifiable from the configuration data;
receiving additional configuration data from an additional mobile device during the session;
subsequent to receiving the additional configuration data, generating, during the session, data indicative of a selection of the mobile device or the entity associated with the mobile device, wherein the data indicative of the selection is generated in response to an input received by the interactive display device; and
based on the data indicative of the selection, configuring the interactive display device to present an additional output and associating the additional output with the entity identifiable from the configuration data received from the mobile device.

15. The method of claim 14, wherein the processing device is included in the interactive display device, wherein the interactive display device presents the output in response to the processing device receiving an input from an interaction object during the session.

16. The method of claim 14, wherein the processing device is included in an interaction object, wherein configuring the interactive display device to present the output comprises emitting, by the interaction object, a signal that instructs the interactive display device to present the output, wherein the signal is generated based on the configuration data.

17. A system comprising:
- a processing device;
- a non-transitory computer-readable medium communicatively coupled to the processing device; and
- a wireless transceiver communicatively coupled to the processing device,
- wherein the processing device is configured for executing program code stored in the non-transitory computer-readable medium to perform operations comprising:
  - identifying a mobile device participating in a session for utilizing an interactive display device that is communicatively coupled to the processing device;
  - receiving configuration data from the mobile device via the wireless transceiver;
  - configuring the interactive display device to present an output during the session;
  - associating, by the processing device, the output with an entity identifiable from the configuration data;
  - receiving additional configuration data from an additional mobile device during the session;
  - subsequent to receiving the additional configuration data, generating, during the session, data indicative of a selection of the mobile device or the entity associated with the mobile device, wherein the data indicative of the selection is generated in response to an input received by the interactive display device; and
  - based on the data indicative of the selection, configuring the interactive display device to present a third output and associating the additional output with the entity identifiable from the configuration data received from the mobile device.

* * * * *